US011097835B2

(12) United States Patent
Goldring et al.

(10) Patent No.: US 11,097,835 B2
(45) Date of Patent: Aug. 24, 2021

(54) ADDITIVELY MANUFACTURED THERMOPLASTIC METERING PIN WITH SLOTS FOR RETENTION HARDWARE

(71) Applicant: GOODRICH CORPORATION, Charlotte, NC (US)

(72) Inventors: Eric Goldring, Milton (CA); Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 109 days.

(21) Appl. No.: 16/261,954

(22) Filed: Jan. 30, 2019

(65) Prior Publication Data

US 2020/0239131 A1 Jul. 30, 2020

(51) Int. Cl.

| | |
|---|---|
| ***B64C 25/60*** | (2006.01) |
| *B33Y 10/00* | (2015.01) |
| *B33Y 80/00* | (2015.01) |
| *F16F 9/32* | (2006.01) |
| *G01F 23/04* | (2006.01) |

(52) U.S. Cl.

CPC ............... *B64C 25/60* (2013.01); *B33Y 10/00* (2014.12); *B33Y 80/00* (2014.12); *F16F 9/3264* (2013.01); *G01F 23/04* (2013.01)

(58) Field of Classification Search

CPC ... B60G 2206/41; B60G 2204/45; F16F 7/00; F16F 7/09; F16F 9/3214; F16F 9/5126; F16F 1/128; F16F 9/34; F16F 2230/02; F16F 9/067; F16F 9/182; F16F 9/3207; F16F 9/3221; F16F 9/3257; F16F 9/3264; F16F 9/342; F16F 9/3242; B64C 25/60; B33Y 30/00; B33Y 80/00

USPC ........................................ 411/104; 188/266

See application file for complete search history.

(56) References Cited

U.S. PATENT DOCUMENTS

| | | | | | |
|---|---|---|---|---|---|
| 2,156,117 | A | * | 4/1939 | Johnson | B64C 25/60 267/64.15 |
| 2,440,353 | A | * | 4/1948 | Wallace | B64C 25/60 267/64.22 |
| 2,443,587 | A | * | 6/1948 | Tack | B64C 25/60 267/64.22 |
| 2,469,912 | A | * | 5/1949 | Bachman | B64C 25/60 267/64.15 |
| 2,471,294 | A | * | 5/1949 | Watts | B64C 25/60 267/64.26 |
| 2,483,429 | A | * | 10/1949 | Pierce | B64C 25/60 267/64.15 |
| 2,737,301 | A | * | 3/1956 | Thornhill | B61G 11/12 213/43 |

(Continued)

FOREIGN PATENT DOCUMENTS

| | | |
|---|---|---|
| CN | 106763424 | 5/2017 |

OTHER PUBLICATIONS

European Patent Office, European Search Report dated Jun. 9, 2020 in Application No. 19215834.3.

*Primary Examiner* — Bradley T King
*Assistant Examiner* — Mahbubur Rashid
(74) *Attorney, Agent, or Firm* — Snell & Wilmer L.L.P.

(57) ABSTRACT

An additively manufactured metering pin may comprise a shaft portion comprising a first end and a second end, a head portion disposed at the second end of the shaft portion, and a slot disposed in the head portion, the slot extending through a perimetrical surface of the head portion and an end surface of the head portion.

18 Claims, 4 Drawing Sheets

(56) References Cited

U.S. PATENT DOCUMENTS 3,062,485 A * 11/1962 Hartel ..................... B64C 25/60
244/63
3,223,401 A * 12/1965 Peterson ................... F16F 9/36
267/126
3,224,599 A * 12/1965 Peterson ................. F16F 9/486
213/43
3,229,971 A * 1/1966 Stretch .................... F16F 9/486
267/120
3,860,225 A * 1/1975 Nakamura .............. B60R 19/32
267/64.15
3,887,224 A * 6/1975 Browne .................. B60R 19/32
293/134
3,892,298 A * 7/1975 Blatt ....................... B60R 19/32
188/289
4,057,264 A * 11/1977 Suzuki ................... B62K 25/08
280/276
4,092,947 A * 6/1978 Labrecque .............. B64C 25/60
116/227
4,095,682 A * 6/1978 Ostrowski ............... F16F 9/342
188/289
4,273,303 A 6/1981 Somm
4,807,860 A * 2/1989 Simons .................. B62K 25/08
188/280
4,934,749 A * 6/1990 Folarin ................... B60R 19/32
188/289
5,478,099 A * 12/1995 Kawahara .............. B62K 25/08
280/276
5,653,425 A * 8/1997 Page ...................... B61G 11/12
188/269
8,245,821 B2 * 8/2012 Mardollo ............... B62K 25/08
188/283
8,434,960 B2 * 5/2013 Lariviere .............. F16B 5/0096
403/22
9,056,650 B2 * 6/2015 Gonzalez ............... B60G 17/06
9,533,542 B2 * 1/2017 Allen ..................... B60G 17/06
2008/0181745 A1 * 7/2008 Naik ....................... F16B 21/09
411/107
2015/0047935 A1 * 2/2015 Godfrey .................. F16F 9/103
188/298
2015/0052898 A1 * 2/2015 Emo ......................... F16F 9/30
60/726
2015/0239046 A1 * 8/2015 McMahan .......... B23K 15/0093
428/548
2016/0040742 A1 * 2/2016 Yamashita .............. F16F 9/103
188/298
2016/0341221 A1 * 11/2016 Twelves, Jr. .......... B22F 3/1055
2017/0184244 A1 * 6/2017 Melito .................. F16L 55/005
2017/0195804 A1 * 7/2017 Sandhu ................. H02J 7/0042
2017/0248191 A1 * 8/2017 Husband ................. B22F 5/009
2017/0307044 A1 * 10/2017 Yamashita .............. F16F 9/185
2017/0369158 A1 12/2017 Gurvich et al.
2018/0283691 A1 10/2018 Corsmeier et al.

* cited by examiner

ADDITIVELY MANUFACTURED THERMOPLASTIC METERING PIN WITH SLOTS FOR RETENTION HARDWARE

FIELD

The present disclosure relates to metering pins for shock strut systems, and more specifically, to systems and methods of manufacturing metering pins for shock strut systems.

BACKGROUND

Shock absorbing devices are used in a wide variety of vehicle suspension systems for controlling motion of the vehicle and its tires with respect to the ground and for reducing transmission of transient forces from the ground to the vehicle. Shock absorbing struts are a common component in most aircraft landing gear assemblies. Shock struts control motion of the landing gear, and absorb and damp loads imposed on the gear during landing, taxiing, braking, and takeoff.

A shock strut generally accomplishes these functions by compressing a fluid within a sealed chamber formed by hollow telescoping cylinders. The fluid generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, similar to a spring, so that upon termination of a compressing force the shock strut returns to its original length. Shock struts also dissipate energy by passing the oil through the orifice so that as the shock absorber is compressed or extended, its rate of motion is limited by the damping action from the interaction of the orifice and the oil.

SUMMARY

An additively manufactured metering pin is disclosed, comprising a shaft portion comprising a first end and a second end, a head portion disposed at the second end of the shaft portion, and a slot disposed in the head portion, the slot extending through a perimetrical surface of the head portion and an end surface of the head portion.

In various embodiments, the end surface defines a terminus of the additively manufactured metering pin.

In various embodiments, the slot is configured to retain a fastener.

In various embodiments, the slot comprises a head slot portion and a shaft slot portion.

In various embodiments, the head slot portion is disposed longitudinally inward from the shaft slot portion with respect to the second end.

In various embodiments, a width of the head slot portion is greater than a width of the shaft slot portion.

In various embodiments, the width of the head slot portion is measured in a circumferential direction and the width of the shaft slot portion is measured in the circumferential direction.

In various embodiments, the additively manufactured metering pin is comprised of a thermoplastic.

A shock strut is disclosed, comprising a strut cylinder, a strut piston operatively coupled to the strut cylinder, and an additively manufactured metering pin comprising a shaft portion comprising a first end and a second end, a head portion disposed at the second end of the shaft portion, and a slot disposed in the head portion, the slot extending through a perimetrical surface of the head portion and an end surface of the head portion.

In various embodiments, the end surface defines a terminus of the additively manufactured metering pin.

In various embodiments, the shock strut further comprises a fastener retained by the slot.

In various embodiments, the slot comprises a head slot portion and a shaft slot portion.

In various embodiments, the head slot portion is disposed longitudinally inward from the shaft slot portion with respect to the second end.

In various embodiments, a width of the head slot portion is greater than a width of the shaft slot portion.

In various embodiments, the width of the head slot portion is measured in a circumferential direction and the width of the shaft slot portion is measured in the circumferential direction.

In various embodiments, the additively manufactured metering pin is comprised of a thermoplastic.

In various embodiments, the fastener extends through the strut piston and further comprising a second fastener coupled to the fastener and disposed externally from the strut piston, the head portion is compressed between the fastener and the strut piston via the second fastener.

A method for installing a metering pin to a shock strut is disclosed, comprising moving a first fastener into a slot disposed in a metering pin, moving the metering pin into a strut piston, and aligning the first fastener with an aperture disposed in the strut piston.

In various embodiments, the method further comprises coupling a second fastener to the first fastener, wherein the second fastener is disposed externally from the strut piston.

In various embodiments, the first fastener is moved radially into the slot disposed in the metering pin and the metering pin is moved longitudinally into the strut piston.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
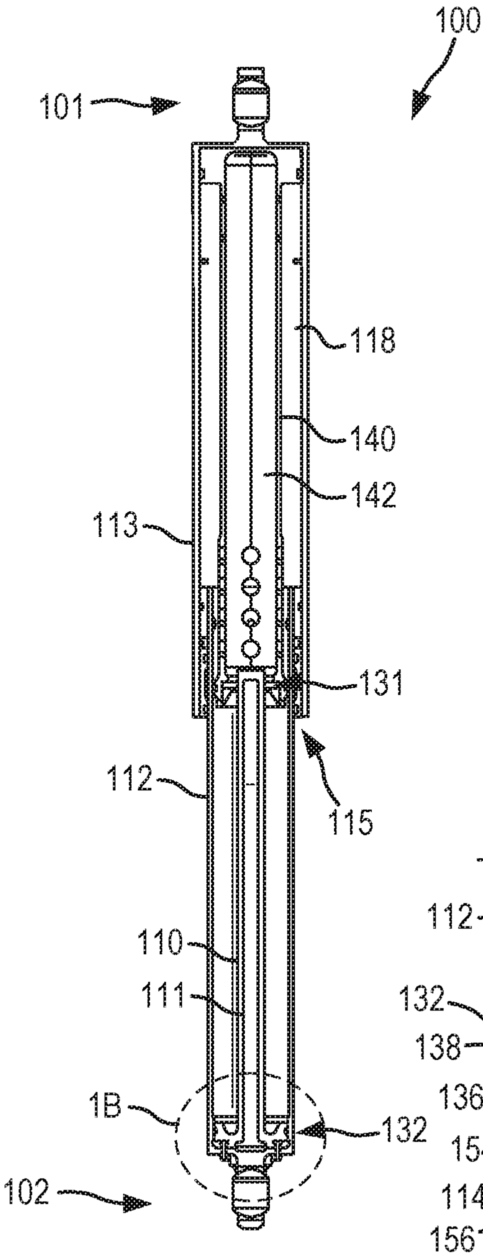
FIG. 1A illustrates a schematic of a shock strut comprising an additively manufactured metering pin, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As disclosed herein, a metering pin may comprise a plurality of slots (also referred to herein as retainer hardware slots) disposed therein for coupling the metering pin to a shock strut.

With reference to FIG. 1A, a section view of a shock strut 100 in a fully extended position is illustrated, in accordance with various embodiments. Shock strut 100 may be configured to absorb and dampen forces transmitted between a vehicle and the ground. Shock strut 100 may comprise a strut piston 112 and a strut cylinder 113. Strut cylinder 113 may be configured to receive strut piston 112 in a manner that allows the two components to telescope together and absorb and dampen forces transmitted between a first end 101 (also referred to herein as a proximal end) and a second end 102 (also referred to herein as a distal end) of shock strut 100. In various embodiments, a fluid, such as a hydraulic fluid, and oil, and/or a gas is located within strut cylinder 113. Strut cylinder 113 and strut piston 112 may, for example, be configured to seal such that liquid contained within strut cylinder 113 is prevented from leaking as strut piston 112 translates relative to strut cylinder 113. Further, strut cylinder 113 may be configured to contain a gas such as nitrogen gas or air. Shock strut 100 may comprise a proximal end 101 and a distal end 102, wherein the distal end 102 is opposite the proximal end 101, the distal end 102 being the end of the shock strut closest to a wheel or wheel assembly of a vehicle. A gas chamber may be positioned above an oil chamber (referred to as an "air-over-oil" arrangement) or vice versa, where the term "above" in this context means in the direction of the proximal end 101 of the shock strut 100. Similarly, strut cylinder 113 and strut piston 112 may be sealed such that gas is prevented from leaking as strut piston 112 moves relative to strut cylinder 113. As such, shock strut 100 may comprise a pressurized environment within strut cylinder 113.

In various embodiments, the strut cylinder 113 may comprise a hollow circular tube having various components disposed within. Strut cylinder 113 may comprise a strut chamber 118. Strut cylinder 113 may comprise an orifice support tube 140. Orifice support tube 140 may comprise a hollow tube having a plurality of orifices through which oil or gas may travel. In this regard, orifice support tube 140 may comprise a tube channel 142 in fluid communication with strut chamber 118. In this regard strut chamber 118 may comprise tube channel 142 defined by orifice support tube 140. Various fluids may be disposed in strut chamber 118. Air may be disposed within strut chamber 118. Oil may be disposed within strut chamber 118, whether alone or in combination with a gas such as air or nitrogen gas.

In various embodiments, strut piston 112 may comprise a hollow circular tube. At least a portion of strut piston 112 may be received by open end 115 of strut cylinder 113. Strut piston 112 may comprise a metering pin 110. Metering pin 110 may move with strut piston 112 with respect to strut cylinder 113. Metering pin 110 may be received in orifice support tube 140. A metering pin orifice 111 may extend axially through metering pin 210. Strut piston 112 may be reciprocally received within the strut cylinder 113. In various embodiments, strut piston 112 may be reciprocally received within strut cylinder 113 in a concentric relationship with and between the strut cylinder 113 and orifice support tube 140.

In various embodiments, one or more bearings may be disposed between strut cylinder 113 and strut piston 112 against which the strut piston 112 slides.

In various embodiments, metering pin 110 may comprise a first end 131 (also referred to herein as a proximal end) and a second end 132 (also referred to herein as a distal end). First end 131 may be received into orifice support tube 140. Second end 132 may be coupled to strut piston 112.

Figure 1B:
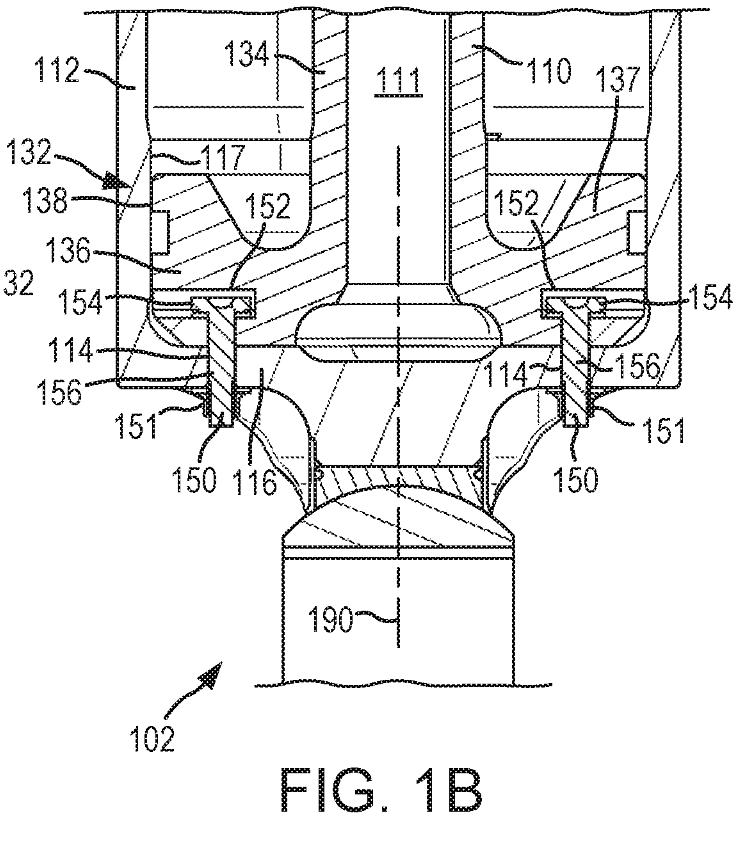
FIG. 1B illustrates an enlarged view of the second end of the additively manufactured metering pin coupled to the shock strut of FIG. 1A, in accordance with various embodiments.

With reference to FIG. 1B, an enlarged view of second end 132 of metering pin 110 coupled to strut piston 112 is illustrated, in accordance with various embodiments. Metering pin 110 may comprise a shaft portion 134 and a head portion 136 extending from the shaft portion 134. Head portion 136 may be disposed at second end 132. Head portion 136 may comprise a flange 137 extending from shaft portion 134. An outer diameter (OD) surface 138 of head portion 136 may mate against an inner diameter (ID) surface 117 of strut piston 112. Metering pin 110 may be coupled to strut piston 112 via head portion 136. In various embodiments, a plurality of fasteners 150 may be coupled between head portion 136 and strut piston 112 to secure metering pin 110 to strut piston 112.

In various embodiments, a plurality of slots 152 may be disposed in head portion 136 whereby the fasteners 150 are coupled to head portion 136. Each fastener 150 may be pre-installed into an associated slot 152 before placing metering pin 110 into strut piston 112. In this regard, the distal portion of head portion 136 disposed between slots 152 and strut piston 112 is compressed between fasteners 150 and strut piston 112 to secure metering pin 110 to strut piston 112. In this manner, fasteners 150 secure metering pin 110 to strut piston 112 without embedded inserts or threads embedded into metering pin 110. In various embodiments, each fastener 150 may comprise a head 154 and a threaded stud 156 extending from the head 154. The head 154 of fastener 150 may be disposed in slot 152 and the threaded stud 156 may extend from slot 152 and through strut piston 112. In this regard, strut piston 112 may comprise a plurality of apertures 114 configured to receive fasteners 150. Plurality of apertures 114 may be disposed in an end wall 116 of strut piston 112. A second fastener 151 may be coupled to fastener 150 to compress a portion of head portion 136 and strut piston 112 between head 154 and second fastener 151. Second fastener 151 may be disposed externally from strut piston 112. Threaded stud 156 may be oriented parallel with a centerline axis 190 of shock strut 100. In various embodiments, fastener 150 is a bolt and second fastener 151 is a nut.

In various embodiments, metering pin 110 is comprised of a thermoplastic material, such as polyethylene (PE), polypropylene, polyvinyl chloride (PVC), or the like. In this regard, metering pin 110 may result in reduced weight of the overall shock strut 100 as compared to metering pins comprised of a metal material or other material which is heavier, per unit volume, than a thermoplastic material.

In various embodiments, metering pin 110 is manufactured using an additive manufacturing process. As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Figure 2A:
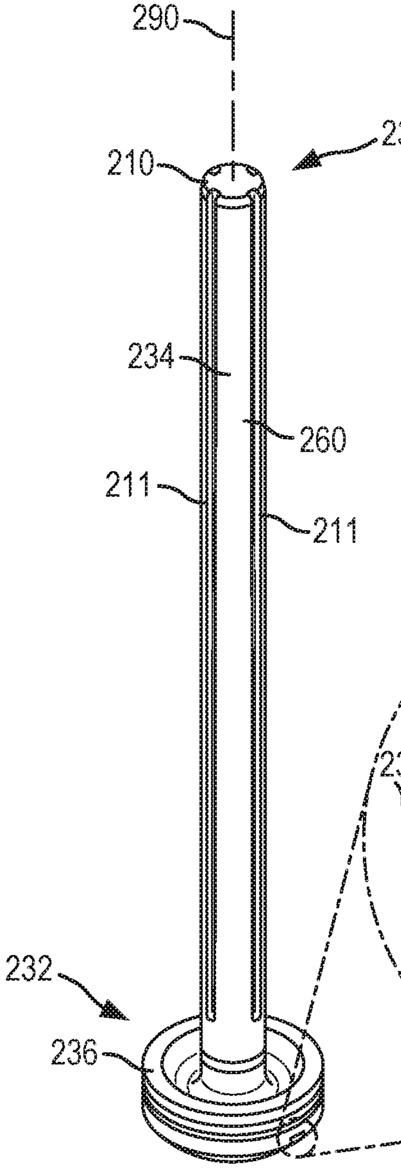
FIG. 2A illustrates a perspective view of an additively manufactured metering pin, in accordance with various embodiments.

With reference to FIG. 2A, a metering pin 210 is illustrated, in accordance with various embodiments Metering pin 210 may be similar to metering pin 110 of FIG. 1A. In various embodiments, metering pin 210 may comprise a first end 231 (also referred to herein as a proximal end) and a second end 232 (also referred to herein as a distal end). First end 231 may be received into orifice support tube 140, with momentary reference to FIG. 1A. Second end 232 may be coupled to strut piston 112, with momentary reference to FIG. 1A.

Metering pin 210 may comprise a plurality of channels 211 disposed along the outer surface 260 of shaft portion 234 whereby a flow of a fluid between strut piston 112 and strut cylinder 113 is metered, with momentary reference to FIG. 1A. Plurality of channels 211 may extend parallel with centerline axis 290 of metering pin 210 along outer surface 260. In this regard, a fluid may flow from within strut piston 112 to strut chamber 118, via plurality of channels 211, in response to shock strut 100 moving towards a compressed position. Inversely, the fluid may flow from within strut chamber 118 to strut piston, via plurality of channels 211, in response to shock strut 100 moving towards an extended position. The size of each channel 211 may vary along the length of metering pin 210 such that the flow of the fluid between strut chamber 118 and strut piston 112 is metered dependent upon the position of strut piston 112 with respect to strut cylinder 113. For example, the depth of each channel 211 may be greater at first end 231 and may decrease in depth along the length of metering pin 210 towards second end 232.

Figure 2B:
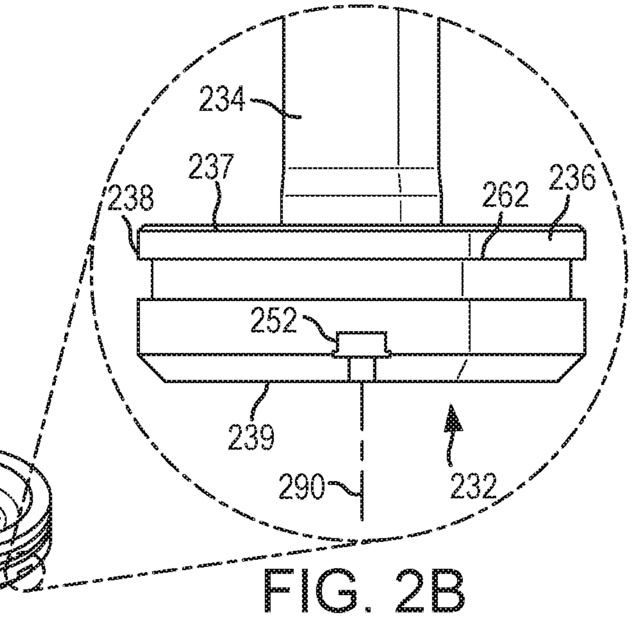
FIG. 2B illustrates an enlarged side view of a head portion having a slot disposed therein of the additively manufactured metering pin of FIG. 2A, in accordance with various embodiments.

With reference to FIG. 2B, an enlarged side view of second end 232 of metering pin 210 is illustrated, in accordance with various embodiments. Metering pin 210 may comprise a shaft portion 234 and a head portion 236 extending from the shaft portion 234. Head portion 236 may be disposed at second end 232. Head portion 236 may comprise a flange 237 extending from shaft portion 234. Head portion 236 may comprise a perimetrical surface 238. Head portion 236 may comprise a seal groove 262 extending perimetrically around head portion 236. In various embodiments, seal groove 262 may be configured to receive a gasket (e.g., an O-ring) therein.

In various embodiments, a plurality of slots 252 may be disposed in head portion 236 whereby a plurality of fasteners are coupled to head portion 236. Head portion 236 may be defined by perimetrical surface 238 and an end surface 239. End surface 239 may define a terminus of metering pin 210 at second end 232. End surface 239 may extend substantially perpendicular with respect to centerline axis 290. Each slot 252 may be disposed in both perimetrical surface 238 and end surface 239. In various embodiments, perimetrical surface 238 may be an outside diameter (OD) surface.

Figure 2C:
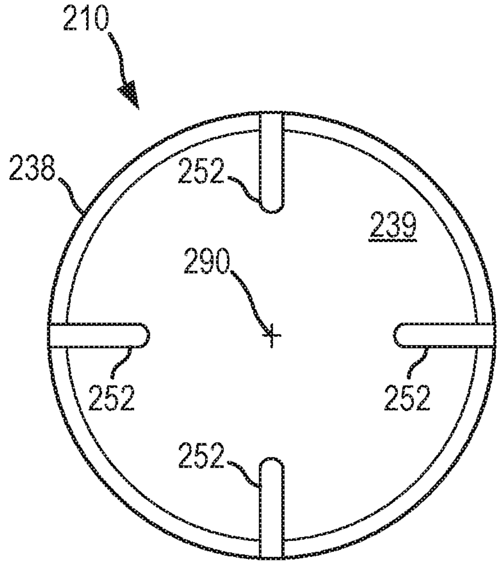
FIG. 2C illustrates an enlarged bottom view of the additively manufactured metering pin of FIG. 2A, in accordance with various embodiments.

With reference to FIG. 2C, a bottom view—i.e., looking at second end 232 (see FIG. 2A)—of metering pin 210 is illustrated, in accordance with various embodiments. Each slot 252 may extend radially along end surface 239. Although illustrated as having four slots 252, it is contemplated herein that any number of slots 252 may be used depending on the desired number of fasteners. For example, two, three, or five slots 252 may be disposed in metering pin 210.

Figure 3:
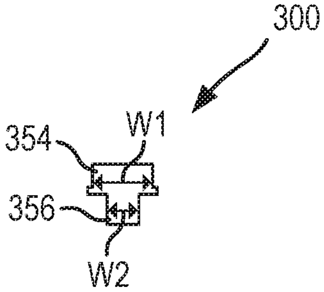
FIG. 3 illustrates a profile of a slot, in accordance with various embodiments.

With combined reference to FIG. 2B and to FIG. 3, slot 252 may comprise a profile 300, as viewed along the radial direction, configured to conform to that of a fastener. In various embodiments, profile 300 has a head slot portion 354 and a shaft slot portion 356. Head slot portion 354 may be disposed longitudinally inward from second end 232 from shaft slot portion 356. Head slot portion 354 may be configured to receive a head of a fastener and shaft slot portion 356 may be configured to receive a shaft of a fastener. A width W1 of head slot portion 354 may be greater than a width W2 of shaft slot portion 356. In various embodiments, width W1 and width W2 are measured along the circumferential direction. In this regard, slot 252 may physically engage a fastener (e.g., fastener 150 of FIG. 1B) to minimize longitudinal movement of the fastener relative to metering pin 210. In this manner, the fastener may be retained within slot 252. In various embodiments, the geometry of head slot portion 354 may conform to that of head 154, with momentary reference to FIG. 1B. In various embodiments, the geometry of shaft slot portion 356 may conform to that of threaded stud 156, with momentary reference to FIG. 1B. With combined reference to FIG. 1B, FIG. 2B, and FIG. 3, slot 252 may be configured to receive fastener 150 by sliding fastener 150 radially inward into slot 252. In various embodiments, head slot portion 354 may be configured to physically engage head 154 of fastener 150 to prevent rotation of fastener 150 in slot 252. In this manner, fastener 150 may be prevented from rotating when installing threaded fastener 151 onto fastener 150. In various embodiments, head slot portion 354 may be configured to physically engage head 154 of fastener 150 to prevent fastener 150 from falling out of slot 252 in the longitudinal direction (i.e., along centerline axis 290). In this regard, slot 252 retains fastener 150. In this regard, the geometry of slot 252 may be configured to conform to the geometry of fastener 150.

Figure 4:
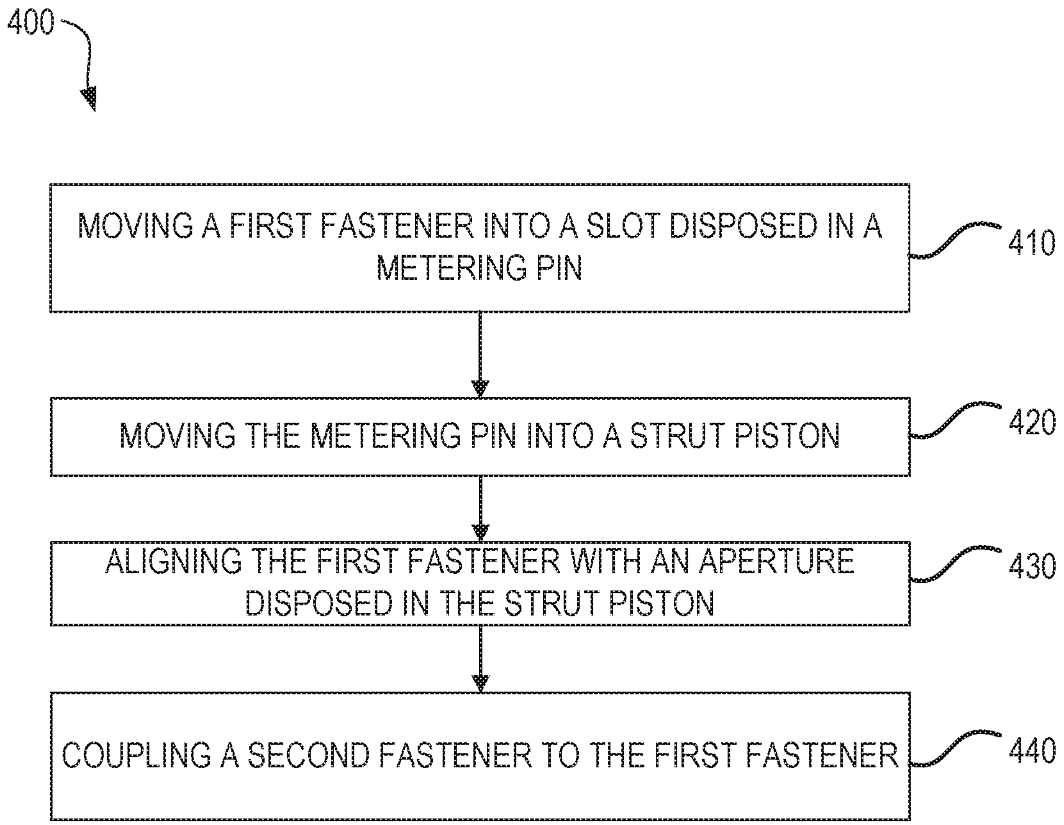
FIG. 4 illustrates a method for installing a metering pin to a shock strut, in accordance with various embodiments.

With reference to FIG. 4, a flow chart for a method 400 for manufacturing a shock strut is provided, in accordance with various embodiments. Method 400 includes moving a first fastener into a slot disposed in a metering pin (step 410). Method 400 includes moving the metering pin into a strut piston (step 420). Method 400 includes aligning the first fastener with an aperture disposed in the strut piston (step 430). Method 400 includes coupling a second fastener to the first fastener (step 440).

Figure 5:
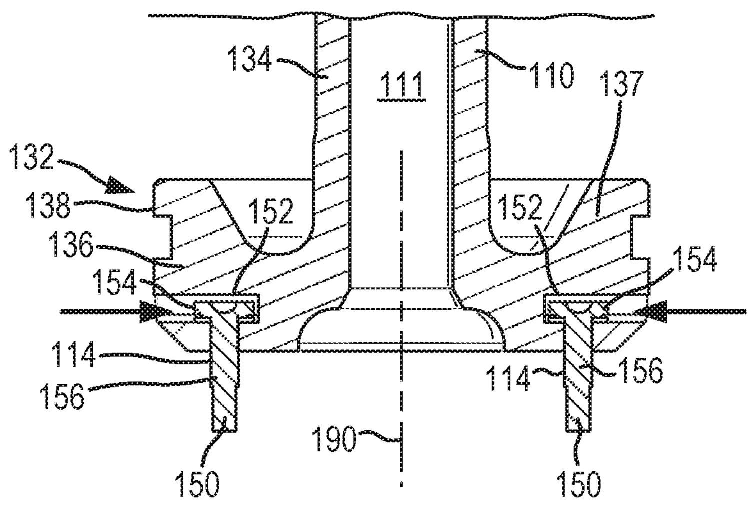
FIG. 5 illustrates a plurality of fasteners being preinstalled into slots disposed in a metering pin, in accordance with various embodiments.

With respect to FIG. 5, elements with like element numbering, as depicted in FIG. 1B, are intended to be the same and will not necessarily be repeated for the sake of clarity.

Figure 6:
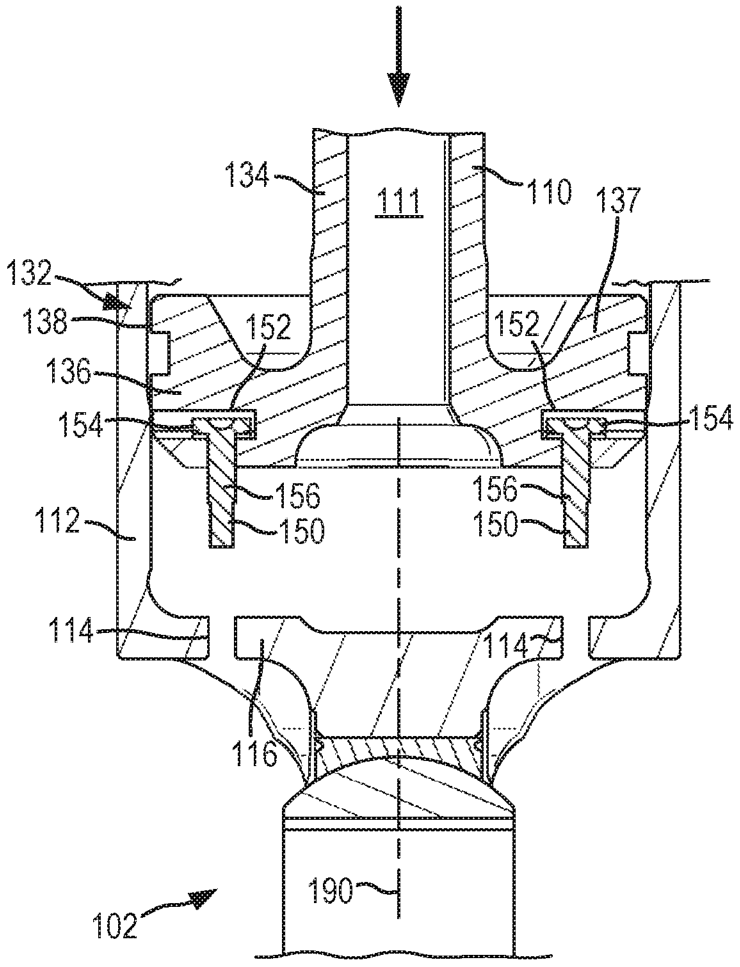
FIG. 6 illustrates the metering pin having the preinstalled fasteners of FIG. 5 being moved into a strut piston, in accordance with various embodiments.

With combined reference to FIG. 4 and FIG. 5, step 410 may include moving fastener 150 into slot 152 disposed in metering pin 110. Fastener 150 may be moved from a radially outer towards a radially inwards direction into slot 152. Stated differently, fastener 150 may be moved radially into slot 152. With combined reference to FIG. 4 and FIG. 6, step 420 may include moving the metering pin 110 into strut piston 112. Metering pin 110 may be moved longitudinally into strut piston 112. Step 430 may include aligning fastener 150 with aperture 114 disposed in the strut piston 112. Fastener 150 may be aligned by twisting metering pin 110 about centerline axis 190 with respect to strut piston 112. In various embodiments, metering pin 110 may be keyed to strut piston 112 to aid in aligning fasteners 150 with apertures 114. With combined reference to FIG. 4 and FIG. 6, step 440 may include coupling second fastener 151 to fastener 150. Metering pin 110 may be moved along centerline axis 190 with respect to strut piston 112 until fasteners 150 extend through apertures 114 such that fasteners 150 can be access from outside of strut piston 112 for installing second fasteners 151 to fasteners 150. In this manner, metering pin 110 may be installed onto strut piston 112.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An additively manufactured metering pin, comprising:
a shaft portion comprising a first end and a second end;
a head portion disposed at the second end of the shaft portion, the shaft portion extending from the head portion; and
a slot disposed in the head portion, the slot extending through a perimetrical surface of the head portion and an end surface of the head portion, wherein the perimetrical surface of the head portion defines a periphery of the additively manufactured metering pin, and wherein the shaft portion defines a centerline axis, and the slot extends through the perimetrical surface of the head portion so as to receive a fastener by sliding the fastener into the slot in a direction that is perpendicular to and towards the centerline axis.

2. The additively manufactured metering pin of claim 1, wherein the end surface defines a terminus of the additively manufactured metering pin.

3. The additively manufactured metering pin of claim 2, wherein the slot is configured to retain a fastener.

4. The additively manufactured metering pin of claim 3, wherein the slot comprises a head slot portion and a shaft slot portion, wherein the head slot portion is disposed longitudinally inward from the shaft slot portion with respect to the second end, and a width of the head slot portion is greater than a width of the shaft slot portion.

5. The additively manufactured metering pin of claim 4, wherein the width of the head slot portion is measured in a circumferential direction and the width of the shaft slot portion is measured in the circumferential direction.

6. The additively manufactured metering pin of claim 1, wherein the additively manufactured metering pin is comprised of a thermoplastic.

7. The additively manufactured metering pin of claim 1, wherein the perimetrical surface of the head portion comprises an outside diameter surface of the head portion.

8. The additively manufactured metering pin of claim 1, further comprising a seal groove disposed in the perimetrical surface.

9. A shock strut, comprising:

a strut cylinder;

a strut piston operatively coupled to the strut cylinder; and an additively manufactured metering pin comprising a shaft portion comprising a first end and a second end, a head portion disposed at the second end of the shaft portion, and a slot disposed in the head portion, the slot extending through a perimetrical surface of the head portion and an end surface of the head portion, wherein the perimetrical surface of the head portion is configured to mate against an inner surface of the strut piston, and wherein the shaft portion defines a centerline axis, and the slot extends through the perimetrical surface of the head portion so as to receive a fastener by sliding the fastener into the slot in a direction that is perpendicular to and towards the centerline axis.

10. The shock strut of claim 9, wherein the end surface defines a terminus of the additively manufactured metering pin.

11. The shock strut of claim 10, further comprising a fastener retained by the slot.

12. The shock strut of claim 11, wherein the slot comprises a head slot portion and a shaft slot portion, wherein the head slot portion is disposed longitudinally inward from the shaft slot portion with respect to the second end, and a width of the head slot portion is greater than a width of the shaft slot portion.

13. The shock strut of claim 12, wherein the width of the head slot portion is measured in a circumferential direction and the width of the shaft slot portion is measured in the circumferential direction.

14. The shock strut of claim 9, wherein the additively manufactured metering pin is comprised of a thermoplastic.

15. The shock strut of claim 11, wherein the fastener extends through the strut piston and further comprising a second fastener coupled to the fastener and disposed externally from the strut piston, the head portion is compressed between the fastener and the strut piston via the second fastener.

16. A method for installing a metering pin to a shock strut, comprising:

moving a first fastener into a slot disposed in a metering pin, wherein the slot extends through a perimetrical surface of a head portion of the metering pin and the slot extends through an end surface of the head portion, and the perimetrical surface of the head portion defines a periphery of the metering pin;

moving the metering pin into a strut piston while the first fastener remains in the slot; and aligning the first fastener with an aperture disposed in the strut piston while the first fastener remains in the slot.

17. The method of claim 16, further comprising coupling a second fastener to the first fastener, wherein the second fastener is disposed externally from the strut piston.

18. The method of claim 16, wherein the first fastener is moved radially into the slot disposed in the metering pin and the metering pin is moved longitudinally into the strut piston.

* * * * *